United States Patent [19]
Ishikawa

[11] Patent Number: 5,379,409
[45] Date of Patent: Jan. 3, 1995

[54] APPARATUS FOR REMOTELY OPERATING COMPUTER SYSTEM

[75] Inventor: Kazuhiko Ishikawa, Tokyo, Japan

[73] Assignee: Kabushiki Kaisha Toshiba, Kawasaki, Japan

[21] Appl. No.: 675,808

[22] Filed: Mar. 27, 1991

[30] Foreign Application Priority Data

Mar. 27, 1990 [JP] Japan .................. 2-75403

[51] Int. Cl.⁶ .............................. G06F 3/04
[52] U.S. Cl. ............... 395/575; 364/DIG. 1; 364/264.2
[58] Field of Search ........... 364/234, 268.1, 268, 364/268.3, 268.9, 285.3; 371/19, 16.3, 16.4, 9.1, 25.1

[56] References Cited

U.S. PATENT DOCUMENTS

| | | | |
|---|---|---|---|
| 4,356,545 | 10/1982 | West | 364/200 |
| 4,773,028 | 9/1988 | Tallman | 364/550 |
| 4,823,343 | 4/1989 | Takahashi | 371/16 |
| 5,016,249 | 5/1991 | Hurst et al. | 371/16.1 |
| 5,084,875 | 1/1992 | Weinberger et al. | 371/291 |
| 5,113,339 | 5/1992 | Komatsu et al. | 395/200 |

*Primary Examiner*—Kevin A. Kriess
*Assistant Examiner*—Jon J. B. Backenstose
*Attorney, Agent, or Firm*—Oblon, Spivak, McClelland, Maier & Neustadt

[57] ABSTRACT

An operation signal from a remote operation input device, e.g., a keyboard is converted into a transmission signal, and the transmission signal is output onto a communication line. The operation signal transmitted through the communication line is decoded, and the decoded signal is supplied to an input device connector of a computer. The computer having no communication function can be remotely operated upon operation of the input device. A video signal output from the computer is encoded, and is displayed on a display device arranged near the input device through another communication line. The presence/absence of a malfunction of the computer, and a malfunctioning point can be checked on the basis of an input to the input device, and a displayed image.

11 Claims, 10 Drawing Sheets

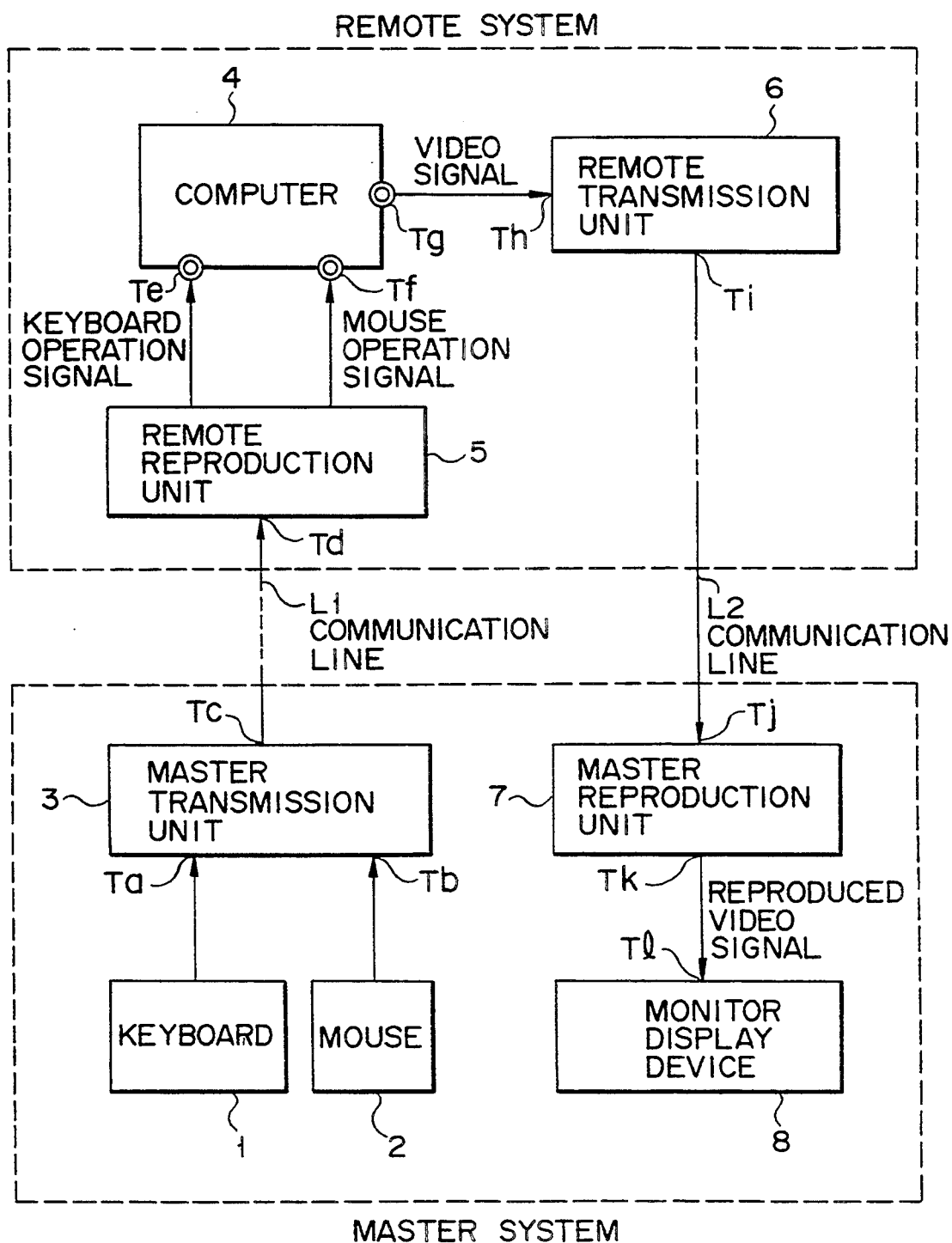
F I G. 1

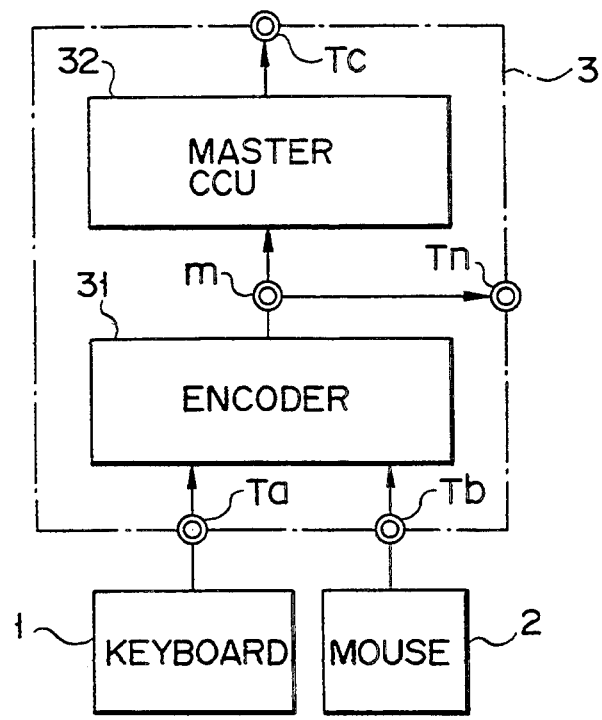
F I G. 2
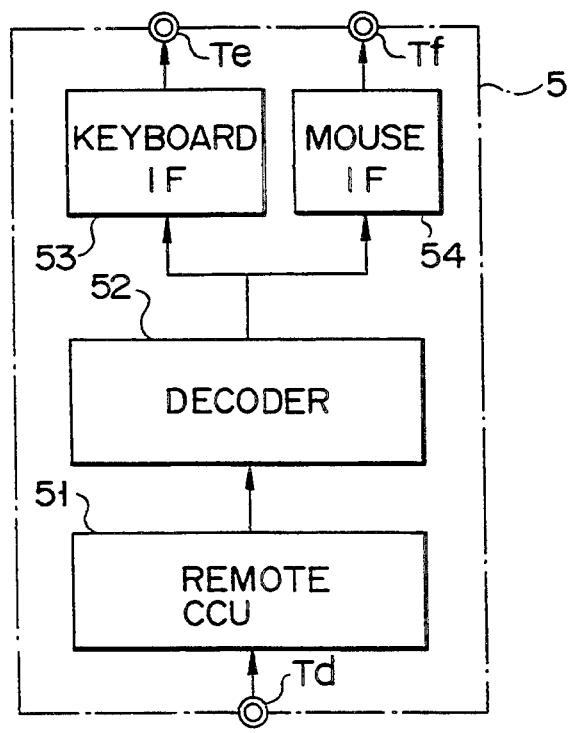
F I G. 3

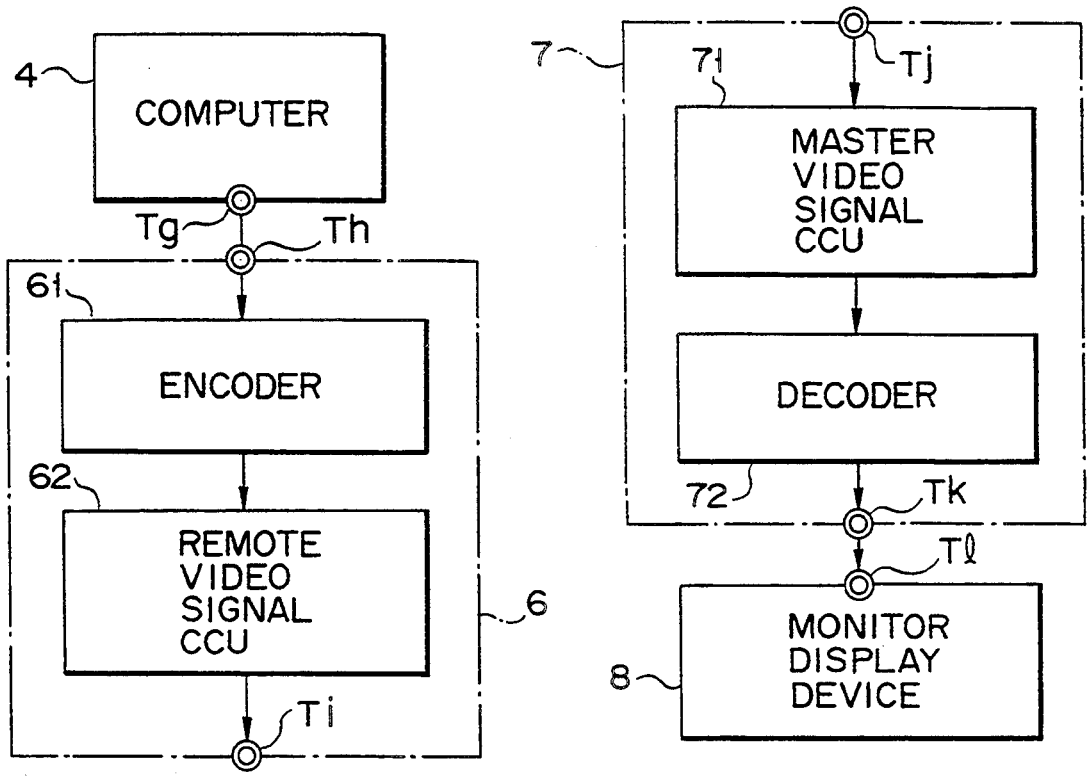
F I G. 4  F I G. 5
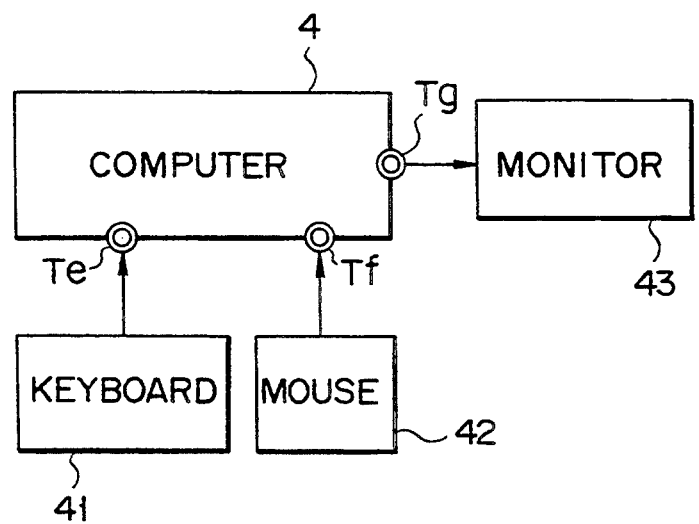
F I G. 6

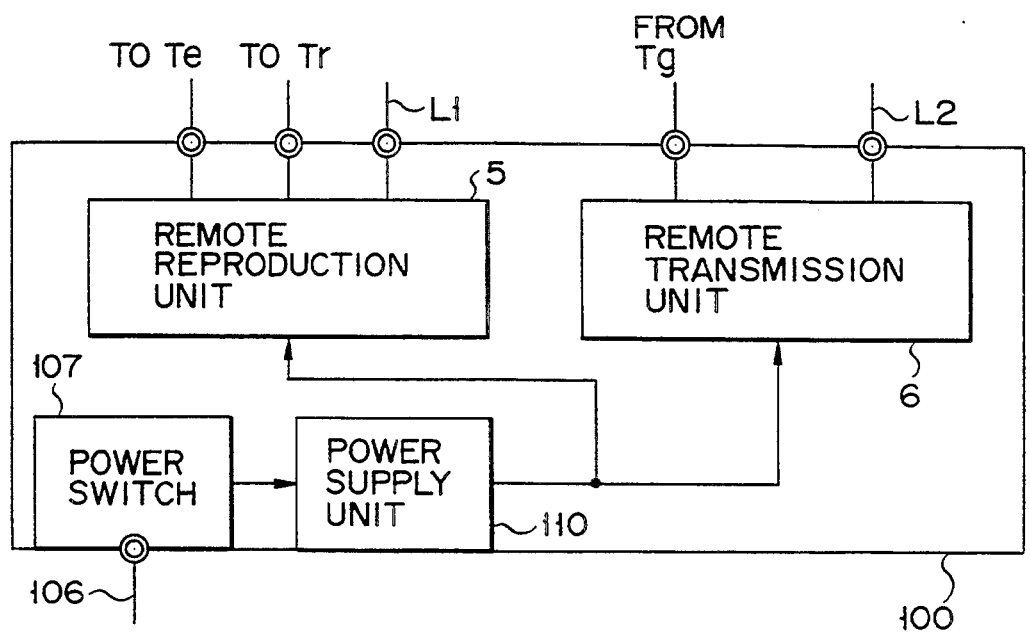
F I G. 8
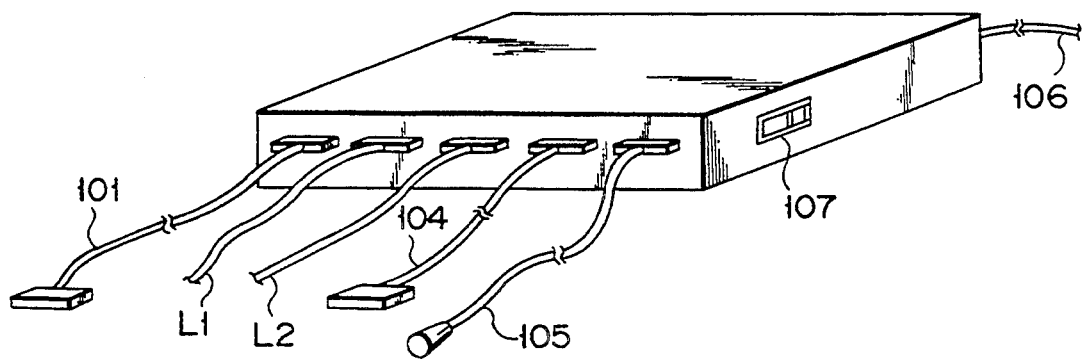
F I G. 9

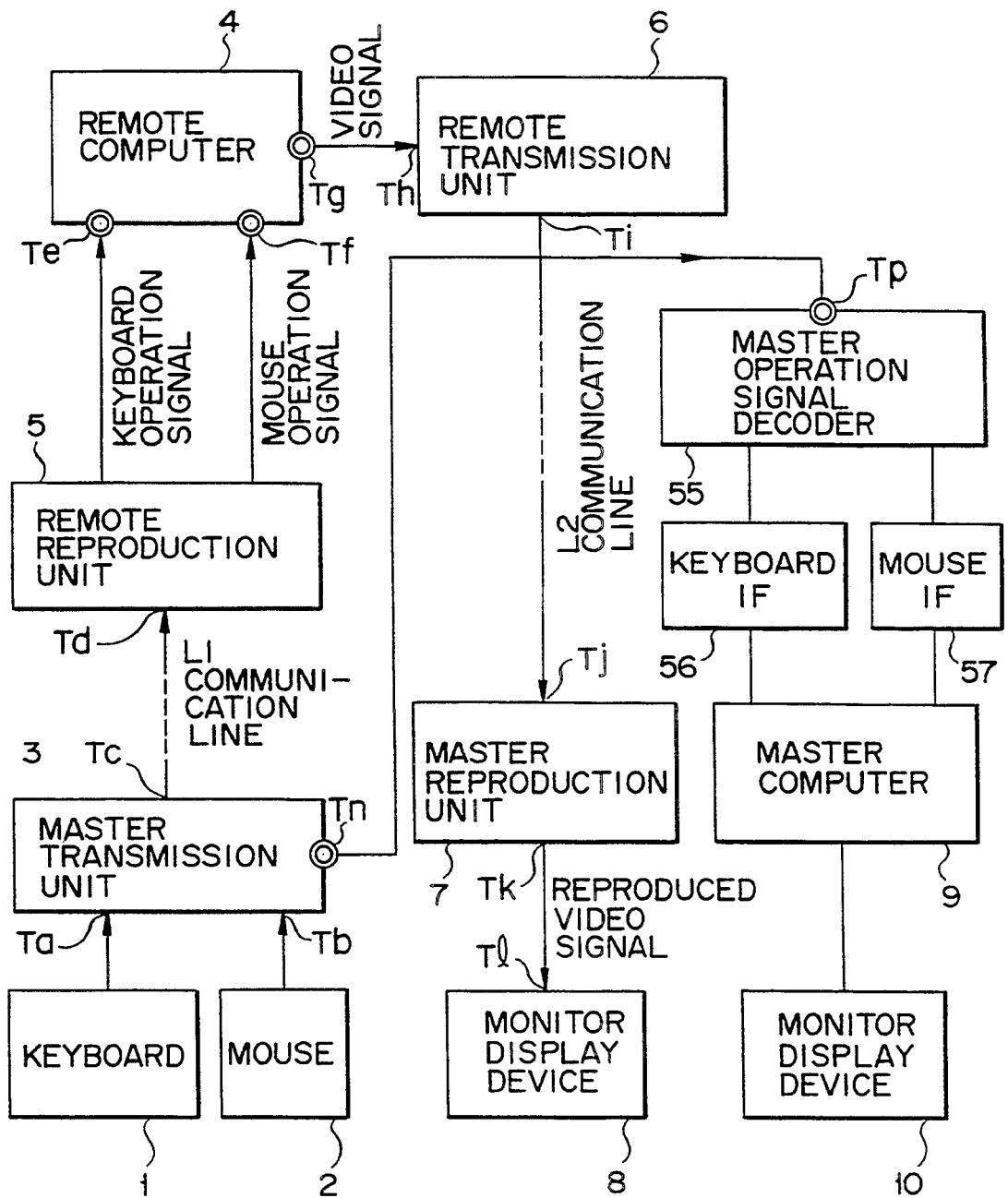
F I G. 10A

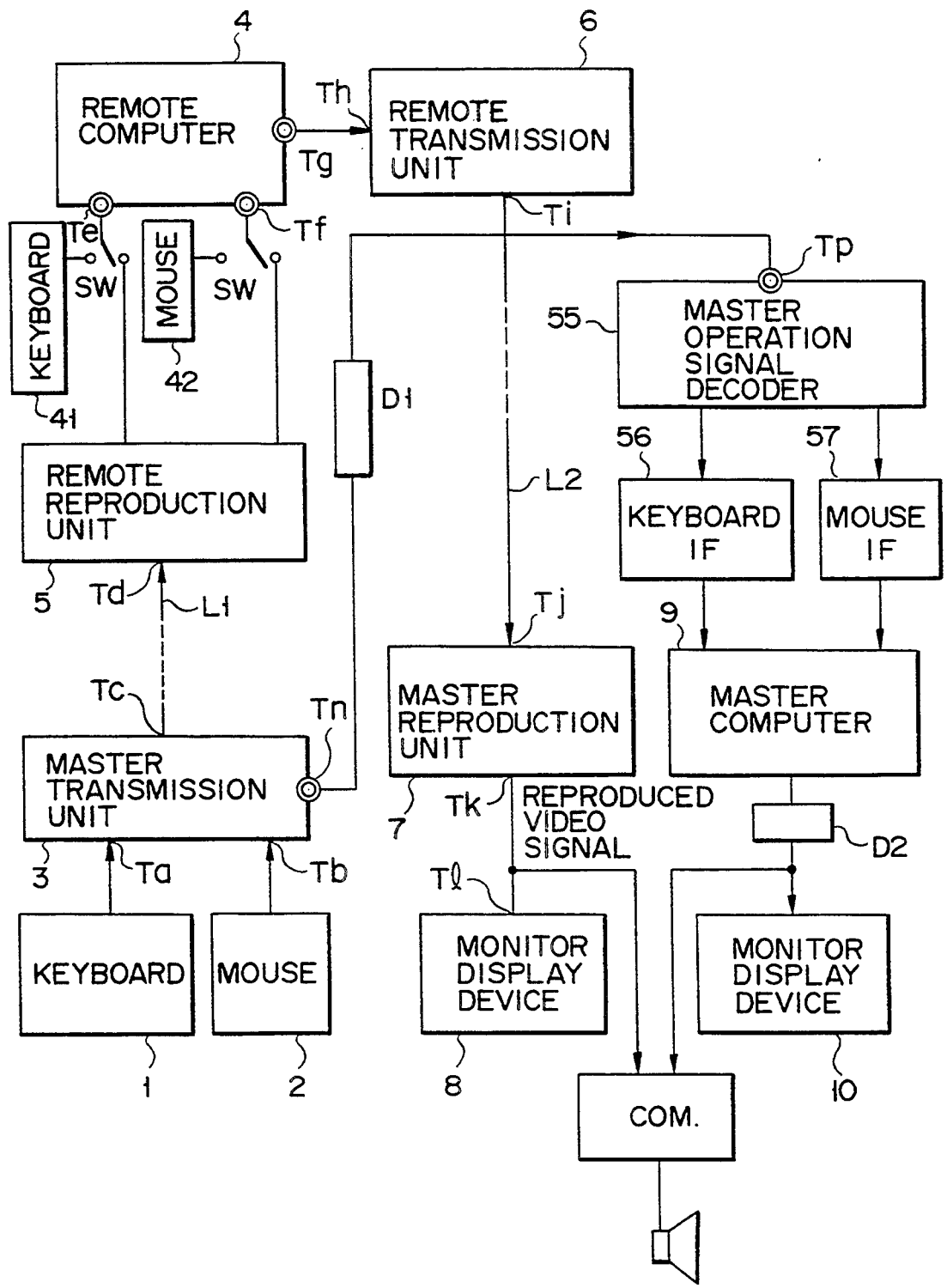
F I G. 10B

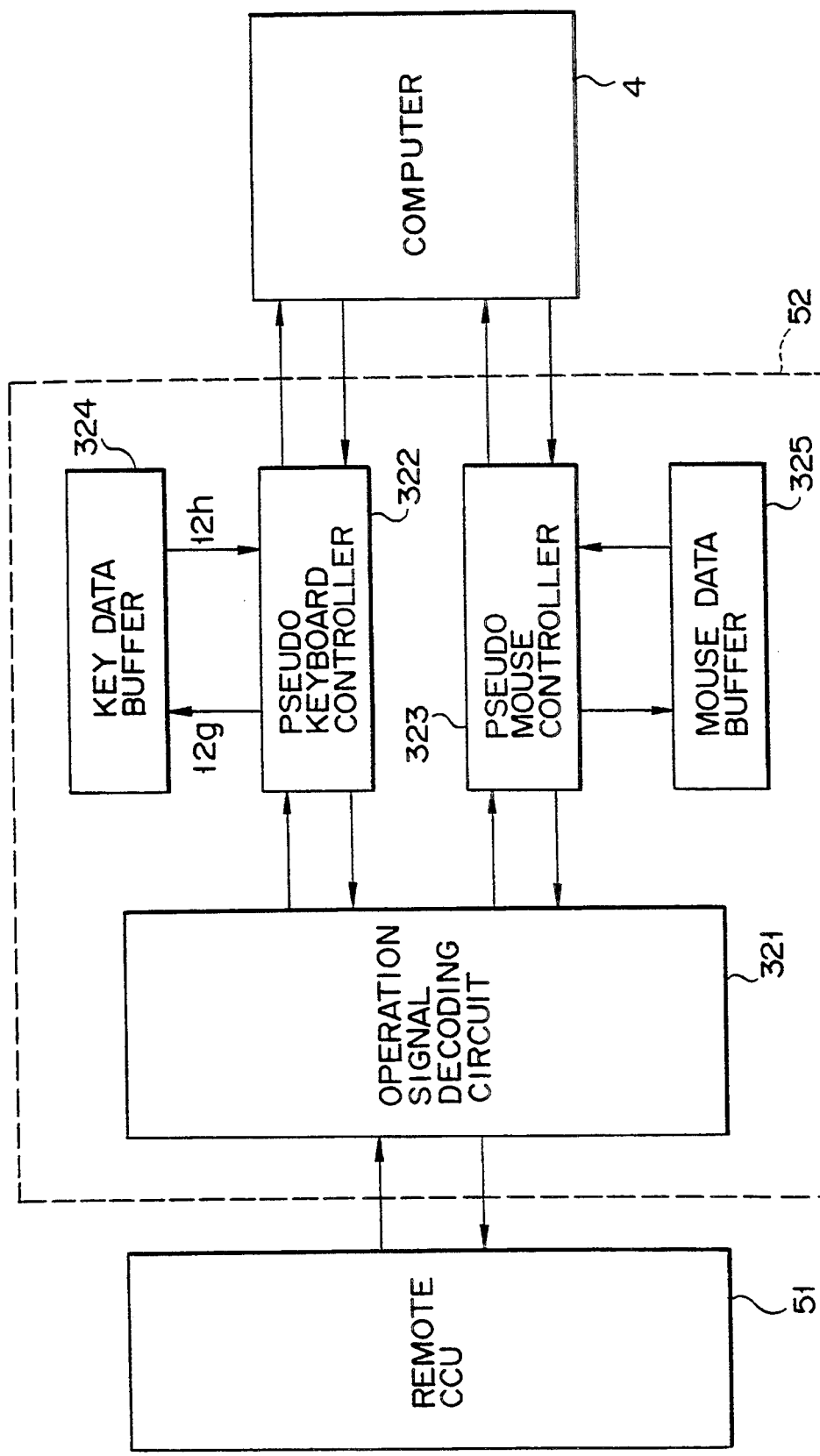
F I G. 12

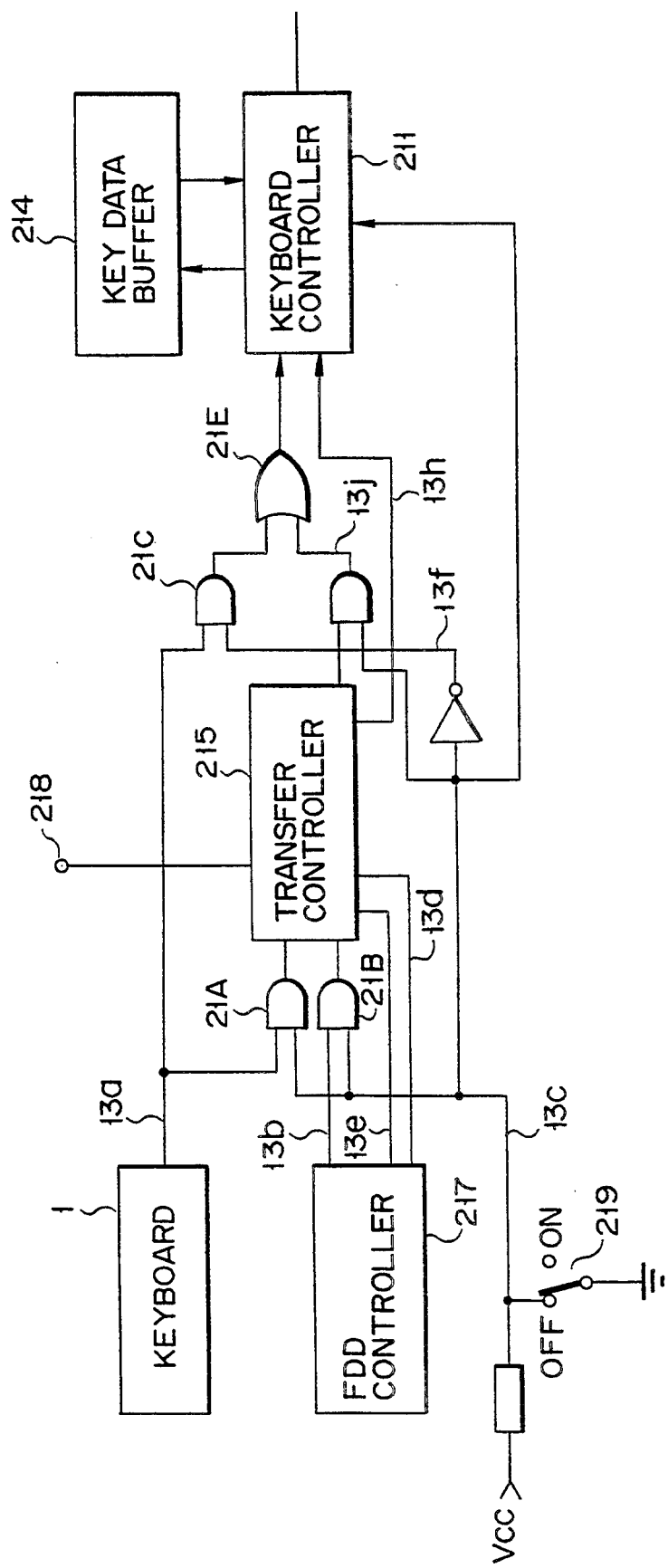
F I G. 13

APPARATUS FOR REMOTELY OPERATING COMPUTER SYSTEM

BACKGROUND OF THE INVENTION

1. Field of the Invention

The present invention relates to a remote operation apparatus for remotely operating a computer system.

2. Description of the Related Art

A computer system can provide its functions after software programs are installed and are normally operated. However, if a software program suffers from some bugs, or a hardware section malfunctions, the computer system is stopped. In this case, a maintenance personnel inquires a state of the abnormal computer system using, e.g., a telephone, and takes countermeasures against expected abnormalities. Thereafter, the personnel goes to a place where the computer system is installed, and repairs the system. If an abnormality found on the installation site is different from his or her expectation, he must obtain required software programs or hardware components. For this reason, jobs to be executed by the computer system may be undesirably disturbed.

In recent years, the number of computer systems is increased, and the systems are distributed all over the world. For this reason, it tends to be difficult to send maintenance personnel to actual locations. Maintenance personnel may be sent all over the world beforehand. However, since the number of maintenance personnel who have maintenance techniques of complex computer systems is not large, and cost is increased, it is difficult to realize it.

SUMMARY OF THE INVENTION

The present invention has been made in consideration of the above situation, and has as its object to provide a remote operation apparatus which can perform, e.g., maintenance of a computer system from a remote location.

It is another object of the present invention to provide an apparatus which can remotely operate a computer system.

It is still another object of the present invention to provide an effective means for improving reliability of a computer.

In order to achieve the above objects, a communication terminal of a malfunctioning computer at a remote location) can be connected to a communication terminal of an inspection computer (on this side) through a communication line, and the inspection computer can be operated to inspect the malfunctioning computer. However, this method suffers from the following drawbacks, and is unsatisfactory. (1) Computers having neither a communication line terminal nor a communication software program, e.g., wordprocessors, work stations, stand-alone type personal computers, and the like cannot be inspected. (2) An inspection to be executed must be installed in a computer to be inspected in the form of software, and it is difficult to perform an inspection according to the will of an inspection personnel. (3) Since a communication software program is used, it is difficult to inspect a relatively low-level malfunction, e.g., whether or not a basic input/output operation can be performed (e.g., whether or not data can be input from a keyboard, whether or not an image is displayed, or the like). (4) when a communication software program in a malfunctioning computer goes down, all the inspections are disturbed. (5) Since a response (reaction) from a computer to be inspected is also received through the communication software program, it is difficult to perform quick inspections. (6) In order to perform highly accurate inspections, a highgrade communication software program must always be prepared in a computer to be inspected, resulting in poor efficiency.

On the other hand, when a computer system is stopped, a corresponding application software program is often also stopped. In this case, various operations at terminals or operation consoles connected to the stopped system may often reveal causes of the malfunction.

Therefore, in order to achieve the above objects, there is provided an apparatus for remotely operating a remote computer system installed at a remote location using a master apparatus, comprising:

(a) the master apparatus, which comprises a master input device for outputting an operation signal, and transmission means, connected to the master input device, for encoding the operation signal from the input device, and transmitting the encoded operation signal to the remote computer system via a first communication line; and (b) the remote computer system, which comprises a remote computer for performing data processing in response to an operation signal from its own input device, reception means, connected to the first communication line, for receiving a signal transmitted from the master apparatus through the first communication line, and decoder means, connected to the reception means and the remote computer, for decoding the received signal into an operation signal, and supplying the decoded operation signal to the remote computer as if the decoded operation signal were an operation signal from the input device of the remote computer.

With the above arrangement, according to the present invention, a computer which does not have a communication function can be remotely operated using basic functions of the computer. Thus, primary diagnosis of hardware sections, and maintenance of software programs of a computer system can be performed by remote operations. Persons on the side of an actual computer system can also be educated while remote operation of various systems (e.g., a CAD system, a computer system for an improved office, and the like) of the computer system is performed by a skilled operator.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram of a system according to the first embodiment of the present invention;

FIG. 2 is a block diagram of a master transmission unit shown in FIG. 1;

FIG. 3 is a block diagram of a remote reproduction unit shown in FIG. 1;

FIG. 4 is a block diagram of a video signal transmission unit shown in FIG. 1;

FIG. 5 is a block diagram of a video signal reproduction unit shown in FIG. 1;

FIG. 6 is a block diagram showing a normal use state of the computer shown in FIG. 1;

FIGS. 8 and 9 are respectively a block diagram and a perspective view showing a modification of the remote reproduction unit shown in FIG. 1;

FIG. 10A is a block diagram of a system according to the second embodiment of the present invention;

FIG. 10B is a block diagram showing a modification of the system shown in FIG. 10A;

FIG. 12 is a block diagram showing a modification of the remote reproduction unit shown in FIG. 1; and FIG. 13 is a block diagram showing an arrangement for receiving data from an external storage device.

DETAILED DESCRIPTION OF THE PREFERRED EMBODIMENTS

Figure 7:
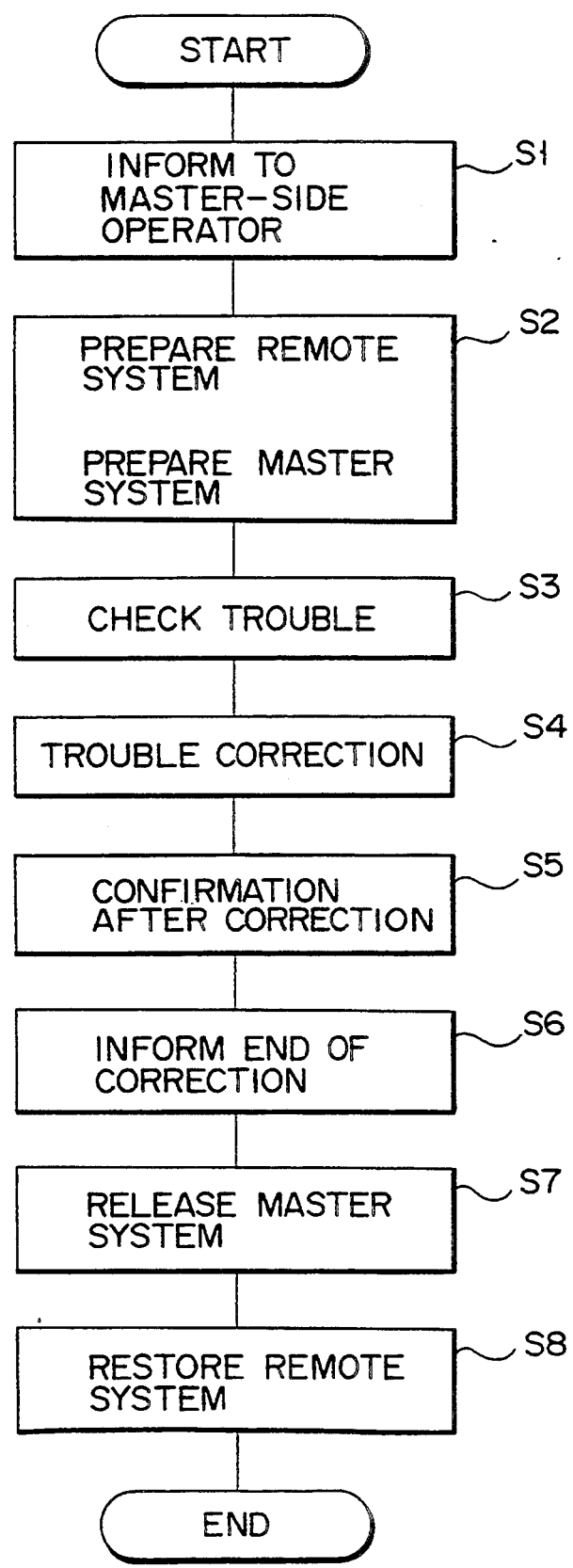
FIG. 7 is a flow chart showing an inspection procedure of the computer.

FIG. 1 shows a remote operation system according to the first embodiment of the present invention. An operation-side system will be referred to as a master system hereinafter, and a computer system to be remotely operated will be referred to as a remote system hereinafter.

The arrangement of the system shown in FIG. 1 will be described below.

The master system comprises a keyboard 1 and a mouse 2. The keyboard 1 has character keys, function keys, and the like, and is used to input commands and data. The mouse 2 serves as a pointing device. The keyboard 1 and the mouse 2 serve as input devices for the remote system when the remote system is remotely operated.

A master transmission unit 3 receives operation signals supplied from the keyboard 1 and the mouse 2 at terminals (connectors) Ta and Tb. The master transmission unit 3 encodes the operation signals supplied from the keyboard 1 and the mouse 2, and transmits the encoded signal to the remote system via a communication line L1. The master transmission unit 3 encodes operation signals, so that their output sources (i.e., the keyboard and the mouse) can be identified.

A computer 4 is an object to be inspected or maintained by remote operations. Input terminals (connectors) Te and Tf of the computer 4 are normally connected to a keyboard 41 and a mouse 42, respectively, as shown in FIG. 6. However, in an inspection state, as shown in FIG. 1, the input terminals Te and Tf of the computer 4 are connected to a remote reproduction unit 5.

The remote reproduction unit 5 receives signals transmitted from the master transmission unit 3 via the communication line L1. The remote reproduction unit 5 decodes the received signals to original operation signals (keyboard and mouse operation signals). The remote reproduction unit 5 sends the decoded operation signals to the computer 4 as if these signals were operation signals from the keyboard 41 and the mouse 42.

An image terminal Tg of the computer 4 is normally connected to its own monitor 43, as shown in FIG. 6. However, in an inspection state, as shown in FIG. 1, the image terminal Tg is connected to a remote transmission unit 6. The remote transmission unit 6 transmits a monitor video signal output from the computer 4 to the master system via a communication line L2.

A master reproduction unit 7 receives a signal transmitted from the remote transmission unit 6 via the communication line L2. The master reproduction unit 7 decodes the received signal to an original video signal. The video signal decoded by the master reproduction unit 7 is supplied to a monitor display device 8. The monitor display device 8 displays an image in response to the supplied video signal. The monitor display device 8 serves as a display device of the computer 4.

FIG. 2 is a block diagram of the master transmission unit 3 shown in FIG. 1. The master transmission unit 3 comprises an encoder 31 connected to the keyboard connector Ta and the mouse connector Tb. The encoder 31 receives operation signals from the keyboard 1 and the mouse 2. The encoder 31 encodes the operation signals by adding a discrimination signal for discriminating the keyboard and the mouse. The output signals from the encoder 31 are supplied to a master communication control unit (to be referred to as a CCU hereinafter) 32. The master CCU 32 mixes the signals supplied from the encoder 31 with a carrier wave to output them onto the communication line L1.

FIG. 3 is a block diagram of the remote reproduction unit 5 shown in FIG. 1. The remote reproduction unit 5 comprises a remote CCU 51. The remote CCU 51 receives signals transmitted from the master transmission unit 3 via the communication line L1, and separates the carrier wave from the received signals. A decoder 52 receives the signals from the remote CCU 51, discriminates signals from the keyboard and the mouse, and decodes the corresponding operation signals. The decoder 52 supplies the decoded keyboard operation signal to a keyboard interface (IF) 53, and supplies the decoded mouse operation signal to a mouse IF 54. The keyboard IF 53 sends the decoded keyboard operation signal to the computer 4 via the keyboard connector Te as if the signal were an operation signal from a directly connected keyboard. The mouse IF 54 sends the decoded mouse operation signal to the computer 4 via the mouse connector Tf as if the signal were an operation signal from a directly connected mouse.

FIG. 4 is a block diagram of the remote transmission unit 6 shown in FIG. 1. The remote transmission unit 6 comprises an encoder 61. The encoder 61 receives a video signal from the computer 4, generates a digital image in units of frames, and encodes the image. The output signal from the encoder 61 is supplied to a remote video signal CCU 62. The CCU 62 transmits the encoded video signal to the master reproduction unit 7 via the terminal Ti and the communication line L2.

FIG. 5 is a block diagram of the master reproduction unit 7 shown in FIG. 1. The master reproduction unit 7 comprises a master video signal CCU 71 for receiving a signal transmitted from the remote transmission unit 6 via the communication line L2, and a decoder 72 for decoding the encoded video signal received by the master vide signal CCU 71 to a signal in units of frames, and converting the decoded signal to an original video signal.

The operation of the system having the arrangements shown in FIGS. 1 to 5 will be described below.

In a normal state, as shown in FIG. 6, the computer 4 is connected to its own keyboard 41, its own mouse 42, and its own monitor 43, and performs a normal operation.

When maintenance of the computer 4 is required, the keyboard 41, the mouse 42, and the monitor 43 are disconnected from the computer 4. The remote reproduction unit 5 and the remote transmission unit 6 are then connected to the computer 4, as shown in FIG. 1. Note that a signal from the terminal Tg of the computer 4 may be branched and supplied to the remote transmission unit 6. Thereafter, the remote system and the master system are started.

When the computer 4 is started, a video signal from the computer 4 is supplied to the encoder 61 of the remote transmission unit 6. Upon reception of the video signal, the encoder 61 generates a digital image in units of frames, and encodes the image. The video signal encoded by the encoder 61 is transmitted from the remote vide signal CCU 62 to the master reproduction unit 7 via the communication line L2. The image data transmitted to the master reproduction unit 7 is received by the master video signal CCU 71 of the unit 7. The decoder 72 decodes the video signal received by the CCU 71 to an original video signal in units of frames. The decoded video signal is input to the monitor display device 8. The video display device 8 displays an image in response to the input video signal. More specifically, a maintenance personnel on the master side can monitor an image based on data processing of the computer 4 using the master display device 8.

The maintenance personnel on the master side operates the keyboard 1 or the mouse 2 by utilizing the display device 8 like a display device connected to the remote computer 4 (computer to be maintained). Keyboard and mouse operation signals are supplied to the encoder 31.

The encoder 31 encodes the keyboard and mouse operation signals, so that they can be discriminated from each other. In this embodiment, the encoder 31 sets the start bit of the encoded keyboard operation signal to be "1", and sets the start bit of the encoded mouse operation signal to be "0". The operation signal encoder 31 adds a destination address (DA), a source address (SA), an error checking code (e.g., a CRC code), and the like to the encoded operation signals to generate communication data (frame data). The encoder 31 converts the communication data into serial data. When the master transmission unit 3 and the remote reproduction unit 5 are connected through a special purpose communication line L1, the destination address (DA) and the source address (SA) can be omitted.

The serial communication data generated by the encoder 31 is output to the master CCU 32, and is mixed with a carrier wave by the CCU 32 to be transmitted to the remote reproduction unit 5 via the communication line L1. The remote CCU 51 of the remote reproduction unit 5 separates the carrier wave from the received signal. The decoder 52 discriminates based on the start bit of the communication data whether the communication data (operation signal) from which the carrier wave is removed is keyboard or mouse operation data (signal). The decoder 52 decodes the communication data into a keyboard or mouse operation signal in accordance with the discrimination result. The decoder 52 outputs the decoded keyboard operation signal to the keyboard IF 53, or outputs the decoded mouse operation signal to the mouse IF 54. The keyboard IF 53 supplies the decoded keyboard operation signal to the connector Te of the computer 4. The mouse IF 54 supplies the decoded mouse operation signal to the connector Tf of the computer 4.

With the above operations, the keyboard or mouse operation signal from the keyboard 1 or the mouse 2 is supplied to the computer 4. As a result, the computer 4 executes data processing as if the keyboard or mouse directly connected to it were operated. The processing result of the computer 4 is displayed on the monitor display device 8 on the side of the maintenance personnel.

As described above, according to this embodiment, an operator can operate a remote computer using the master-side keyboard 1 or mouse 2, and can confirm processing of the computer executed upon operation of the keyboard or mouse on the master-side display device. More specifically, according to this embodiment, an operator can use a remote computer system without going to a place where the corresponding system is installed. In addition, neither a communication terminal nor a communication software program of a computer are used.

Three use examples of the remote operated system will be described below.

(1) To Install Application System (Software) in Computer, and Execute Application System When an application system of a computer suffers from bugs, or functions of the computer are to be extended, a correct or new application system must be installed in the computer. In this case, the application system may be loaded to the computer using a communication software program via a communication line and a communication terminal of the computer.

With this method, however, it is difficult to perform environmental setting, e.g., to expand a working memory, to save a conventional software program until a test is completed, and to change a location of an external memory. All the application system cannot always be operated via a network. Therefore, this method often cannot test the application system.

In this embodiment, an application program is installed in the computer 4 using the master-side keyboard 1 or mouse 2, and can be executed.

(2) To Specify Trouble Point When Trouble is Found in Computer System, and Repair Trouble Point When a trouble is found in a computer system, the system of this embodiment can specify a trouble point, and can repair a trouble point. This operation will be described below with reference to FIG. 7.

When a trouble is found in, e.g., an operation of the computer 4, a user informs a master-side maintenance personnel of a trouble state of the computer 4 by, e.g., a telephone (step S1). Thereafter, the user prepares for a remote system, and a master-side operator prepares for a master system (step S2).

In preparation on the remote side, the keyboard 41, the mouse 42, and the monitor 43 connected to the computer 4 are disconnected, the remote reproduction unit 5 and the remote transmission unit 6 are connected to the computer 4 instead, and their power switches are turned on. In preparation on the master side, the power switches of the master transmission unit 3, the master reproduction unit 7, and the monitor display device 8 are turned on.

The master-side operator then starts to inspect a trouble point (step S3).

Various procedures for inspecting troubles may be adopted. An example will be described below. Existing software programs and data are saved on, e.g., a magnetic disk memory of the computer 4 (if necessary, the maintenance personnel notifies the user to connect an external storage device to the computer 4). It is then checked if a trouble occurred in a hardware section or a software program. If it is determined that the hardware section is defective, a trouble point is specified by various hardware test software programs. The hardware test software programs may be stored beforehand in an external disk of the computer 4, or may be loaded in the computer 4 using, e.g., the keyboard 1 or a data cassette connected to the master transmission unit 3 (a loading method will be described later with reference to FIG. 13).

When a trouble point is specified, the hardware section or the software program from which the trouble is found is repaired (step S4). An operation for correcting the trouble of the hardware section means replacement of hardware components. An operation for correcting the trouble of the software program means replacement of the software program suffering from the trouble with a corrected software program. The operation for correcting the trouble of the hardware section is executed on the remote side. The operation for correcting the trouble of the software program is executed by replacing the software program suffering from the trouble with a software program which is confirmed to be correct by another machine, or by rewriting a wrong statement with a correct statement.

Note that a trouble correction normally requires a considerable time. Thus, when inspection of a trouble point is completed, the master system is released, and the remote system is restored.

After the correction is completed, a recall test and a troubleshooting test are repetitively executed to perform confirmation and processing after the correction (step S5).

After the correction is completed, the master-side operator informs the remote side of completion of the correction (step S6), and executes release processing, e.g., turns off the power switches of the master system (step S7).

Thereafter, the remote system is restored (step S8). Restoration of the remote system is attained by executing the preparation of the remote system in the reverse order.

(3) Periodic Check of Computer

Normally, the periodic check of the computer is executed by loading a test software program in a computer to be checked, and operating the test software program. For this reason, in a conventional system, a maintenance personnel goes to a location where the computer is installed so as to execute the check. However, in this embodiment, a test software program stored in a remote computer is called by the master system, or the test software program is loaded from the master system to the remote computer, and the test software program is remotely operated, so that the computer installed at a remote location can be checked.

A procedure of a checking operation will be described in detail below. At the time of maintenance, a master-side maintenance personnel informs a person who in charge of a remote system of it. In response to this information, the master and remote systems are prepared. The contents of the preparations are the same as the above-mentioned case wherein an operation error is found. Then, the computer 4 is checked. As contents of the check, for example, existing software programs and data are saved, and a maintenance software program and/or a hardware check software program is called and executed.

When the check is completed successfully, the master-side maintenance personnel informs the user of it. When an abnormality is found, the same processing as in the above-mentioned case wherein an operation error is found is performed.

As described above, according to the first embodiment, a remote computer can be operated and inspected using an input/output device of a master system, resulting in very high efficiency. In particular, since neither a communication software program nor a communication terminal of a computer to be inspected are used, a computer having no communication function can be inspected. Since a computer is inspected using a basic input/output device (e.g., a keyboard), inspection is easier than a case wherein inspection is performed using, e.g., a communication software program, and reliability of inspection can be improved.

Note that display information transmitted from the remote system to the master system via the communication line L2 may not be information for the entire frame but may be a portion which changes from a previous state. With this technique, a communication amount can be considerably decreased. This technique is described in, for example, Tasaki et al., "Systematization of Dynamic Image Encoding, and its Application", Reports of Society of Electronic Information Communication, Vol. 71, No. 7, pp. 663–668 (July, 1988). The contents of this publication are incorporated in this specification for reference.

A user of the computer 4 usually has only a superficial knowledge of the computer unlike the master-side maintenance personnel. In order to facilitate the preparation of the remote system in step S2 in FIG. 7 in this case, a case wherein devices to be connected to the computer 4 are stored in one housing will be described below with reference to FIG. 8 and 9.

As can be seen from FIGS. 8 and 9, the remote reproduction unit 5, the remote transmission unit 6, and a power supply unit 110 are arranged in a housing 100, and only terminals and wires necessary for connection are arranged outside the housing 100. In response to an ON/OFF operation of a power switch 107 arranged on the housing 100, the power supply unit 110 supplies a DC power to the remote reproduction unit 5 and the remote transmission unit 6.

When the arrangement shown in FIGS. 8 and 9 is adopted, terminals 101, 105, and 104, and a power supply line 106 need only be connected to the keyboard terminal Te, the mouse terminal Tf, the video terminal Tg, and a commercial power supply, respectively, thus completing preparation of the remote system. As a result, the preparation can be very easy.

FIG. 10A is a block diagram showing the second embodiment of the present invention. The same reference numerals in FIG. 10A denote the same parts as in FIG. 1, and a detailed description thereof will be omitted.

In the system shown in FIG. 10A, a computer (master computer) 9 which is the same as a remote-side computer (to be referred to as a remote computer hereinafter for the sake of simplicity) 4 is arranged, so that the master and remote computers 9 and 4 are caused to parallelly perform the same operation, and the outputs from the two computers are compared with each other.

In the system shown in FIG. 10A, a signal output from a master transmission unit 3 to a remote reproduction unit 5 is branched from a connector Tn, and is supplied to a master operation signal decoder 55 arranged in the master system. A keyboard operation signal decoded by the operation signal decoder 55 is input to the master computer 9 via a keyboard IF 56, and a decoded mouse operation signal is input to the master computer 9 through a mouse IF 57. A processing result by the master computer 9 is supplied to a monitor display device 10, and is displayed thereon. Note that the master operation signal decoder 55 has substantially the same arrangement as a decoder 52 of the remote reproduction unit 5. The keyboard IF 56 has substantially the same arrangement as a keyboard IF 53 of the master reproduction unit 5, and the mouse IF 57 has substantially the same arrangement as a mouse IF 54 of the master reproduction unit 5. Therefore, the remote and master computer systems perform the same operation.

In the arrangement shown in FIG. 10A, operation signals from a keyboard 1 and a mouse 2 are supplied to both the remote and master computers 4 and 9, and the two computers are basically operated in response to the same operation instruction. The processing result of the remote computer 4 is displayed on a monitor display device 8, and the processing result of the master computer 9 is displayed on a monitor display device 10. A maintenance personnel on the master side operates the keyboard 1 or the mouse 2 while comparing the display contents of the two monitor display devices 8 and 10 to compare the operations of the two systems, thereby efficiently executing maintenance. When the two computers 4 and 9 are started, mouse positions managed by the two computers 4 and 9 must be caused to coincide with each other.

In the system shown in FIG. 10A, the processing result of the remote computer 4 may be displayed on the screen to be delayed from the processing result of the master computer 9 due to transmission delay times caused by communication lines L1 and L2. In order to eliminate this drawback, as shown in FIG. 10B, delay circuits D1 and D2 may be arranged between the master transmission unit 3 and the master operation signal decoder 55 and/or between the master computer 9 and the monitor display device 10. When delay times of the delay circuits D1 and D2 are appropriately set, the processing results of the two computers 4 and 9 can be displayed on the two display devices 8 and 10 at the same timing.

In the arrangement shown in FIG. 10A, a maintenance personnel determines whether or not images displayed on the display devices 8 and 10 coincide with each other. As shown in FIG. 10B, a coincidence between two images may be automatically detected, and when a non-coincidence is detected, an alarm may be generated. In FIG. 10B, a video signal output from the master reproduction unit 7 is compared with a video signal output from the master computer 9 by a comparator COM, and when a non-coincidence is detected, an alarm is generated by a loudspeaker. In this arrangement, it is difficult to sequentially compare all the two video signals. Thus, it is preferable to adopt a technique for considerably decreasing a communication amount in such a manner that information to be displayed is not information of the entire frame but only a portion which changes from a previous state.

In the arrangements shown in FIGS. 1 and 10A, the input/output devices of the computer 4 must be disconnected, and inspection equipments must be connected so as to perform inspection. As shown in FIG. 10B, a switch SW may be arranged, and the original input devices 41 and 42 of the computer 4, and the inspection/maintenance equipments 5 and 6 may be switched.

In each of the first and second embodiments, data input from the keyboard 1 is basically performed character by character while observing a display on the monitor display device 8 or 10. However, in each of the above embodiments, since the communication lines L1 and L2 are used, display speeds of the monitor display devices 8 and 10 are low, and it is often difficult to perform smooth data input. In this case, a buffer may be arranged in the encoder 31, as shown in FIG. 11.

Figure 11:
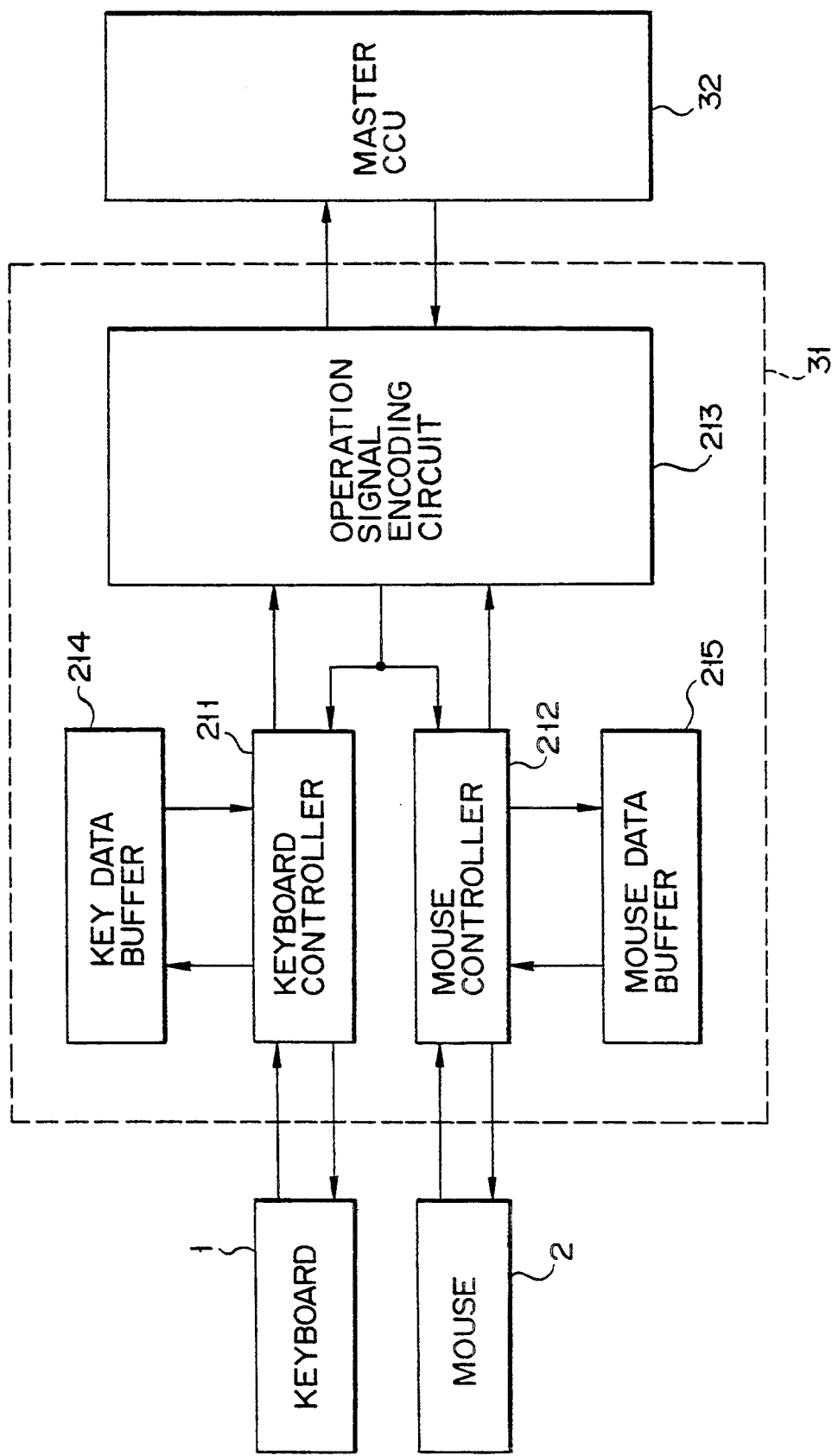
FIG. 11 is a block diagram showing a modification of the master transmission unit shown in FIG. 1.

In the circuit shown in FIG. 11, a keyboard controller 211 transfers an operation signal supplied from the keyboard 1 to an encoding circuit 213 in response to a read enable signal from the encoder 31. The encoding circuit 213 encodes the input operation signal, and supplies the encoded signal to the master CCU 32. When the read enable signal from the encoding circuit 213 is delayed, the keyboard controller 211 stores the supplied key operation data in a key data buffer 214. When the key data buffer 214 becomes full, the keyboard controller 211 stops output of the read enable signal to the keyboard 1. As a result, a keyboard operation signal can no longer be accepted, and key operations are ignored. When data is stored in the key data buffer 214, the keyboard controller 211 reads out the key operation signal from the key data buffer 214 and outputs it to the encoding circuit 213 every time the read enable signal is output from the encoding circuit 213.

The same applies to a mouse operation signal. That is, when a read enable signal from the operation signal encoding circuit 213 is delayed, a mouse operation signal is stored in a mouse data buffer 215. The mouse operation signal stored in the buffer 215 is supplied to the encoding circuit 213 in response to the read enable signal.

FIG. 12 is a block diagram of an improved remote reproduction unit 5.

In FIG. 12, a decoding circuit 321 decodes data (encoded operation signal) supplied from the remote CCU 51 to discriminate keyboard and mouse operation signals. The decoded key operation signal is supplied to a pseudo keyboard controller 322. The pseudo keyboard controller 322 outputs the key operation signal to the computer 4 in response to a read enable signal from the computer 4. When supply of the read enable signal from the computer cannot catch up with supply of the key operation signal from the decoding circuit 321, the pseudo keyboard controller 322 stores the supplied key operation signal in a key data buffer 324. The pseudo keyboard controller 322 outputs the stored key operation signal to the computer 4 in response to a read enable signal. When the key data buffer 324 becomes full, supply of data from the decoding circuit 321 to the pseudo keyboard controller 322 is stopped, and the read operations of the upstream circuits are stopped in accordance with a control signal.

On the other hand, the decoded mouse operation signal is supplied to a pseudo mouse controller 323. The pseudo mouse controller 323 outputs the mouse operation signal to the computer 4 in response to a read enable signal from the computer 4. When supply of the read enable signal from the computer 4 cannot catch up with supply of the mouse operation signal from the decoding circuit 321, the pseudo mouse controller 323 stores the supplied mouse operation signal in a mouse data buffer 325. The pseudo mouse controller 323 outputs the stored mouse operation signal to the computer 4 in response to the read enable signal. When the mouse data buffer 325 becomes full, supply of data from the decoding circuit 321 to the pseudo mouse controller 323 is stopped, and read operations of the upstream circuits are also stopped in accordance with a control signal.

A software analysis software program, a hardware check software program, test data, and the like which require only a small memory capacity, are normally stored in the computer 4 to be maintained. A maintenance personnel calls these software programs and data to perform the check. However, when a storage device for storing these software programs or a read device malfunctions, or when none of these programs are stored, the corresponding software program and data must be input by operating the keyboard 1 of the master system. However, it is very cumbersome and time-consuming to input the entire software program from the keyboard 1. FIG. 13 shows an input device which can eliminate this drawback.

The circuit shown in FIG. 13 is a circuit for supplying a software program prestored in an FDD (floppy disk drive) to the remote computer 4 as if the program were input by operating the keyboard 1.

In FIG. 13, a transfer controller 216 reads data supplied from an FDD controller 217 in accordance with an instruction from the keyboard 1. The transfer controller 216 outputs the supplied data in accordance with a read enable signal 13h from the keyboard controller 211. A timing for reading data from the FDD controller 217 by the transfer controller 216 is controlled based on a control signal (read signal) 13e output from the transfer controller 216 and a status signal output from the FDD controller 217. A switch 219 sets a logic value of a signal 13c to be "0" to instruct to read data from the keyboard 1 when it is OFF, and sets a logic value of the signal 13c to be "1", to instruct to read data from the FDD when it is ON. An AND gate 21A supplies the key operation signal from the keyboard 1 to the transfer controller 216 in response to the signal 13c only when the switch 219 is turned off. An AND gate 21B supplies data from the FDD controller 217 in response to the signal 13c only when the switch 219 is turned off. An AND gate 21C supplies the key operation signal from the keyboard 1 to the keyboard controller 211 through an OR gate 21E in response to an inverted signal 13f of the signal 13c only when the switch 219 is turned on. An AND gate 21D supplies data from the transfer controller 216 to the keyboard controller 211 through the OR gate 21E in response to the signal 13c only when the switch 219 is turned off.

When data stored in the FDD is to be supplied to the computer 4, a user (maintenance personnel on the master side) turns on the switch 219. Thus, the control signal 13c goes to "1", level, and the control signal 13f goes to "0" level. For this reason, the AND gate 21C is disabled to stop supply of a key operation signal 13a to the keyboard controller 211. On the other hand, the AND gates 21A and 21B are enabled, and the output signal 13a from the keyboard 1 and an output signal 13b from the FDD controller 217 are supplied to the transfer controller 216.

In this state, a maintenance personnel inputs a file name to be read using the keyboard 1. In response to this instruction, the transfer controller 216 reads, e.g., file name data from the FDD controller 217, and searches one coinciding with the file name input from the keyboard 1. The transfer controller 216 starts reading of the corresponding file in accordance with an address of the file. The transfer controller 216 turns on a lamp 218 for indicating that reading is under execution.

Data loaded to the transfer controller 216 is supplied to the keyboard controller 211. The keyboard controller 211 is substantially the same as that shown in FIG. 11, and processes the supplied data as a key operation signal. When a code of a key operation signal from the keyboard 1 is different from that of data stored in the FDD, the keyboard controller 211 performs code conversion of data supplied from the FDD, as needed. Completion of reading of data stored in the FDD can be determined by the status information 13e. When reading is completed, the FDD controller 216 turns off the lamp 218. Thus, an operator can confirm the end of transfer.

When reading is to be interrupted since a wrong file name to be read is input or for any other reasons, a user inputs a certain character from the keyboard 1. The FDD controller 216 then determines that reading is to be interrupted, and forcibly ends the reading operation. In this case, the lamp 218 is turned off.

When data is to be input from the keyboard, the switch 219 is turned off. The control signal 13c goes to "0" level, and the control signal 13f goes to "1" level. Thus, the key operation signal 13a from the keyboard 1 is supplied to and processed by the keyboard controller 211.

Note that the FDD has been exemplified as an external storage device. In place of the FDD, a hard disk device, a magnetic tape device, or the like may be used.

In this embodiment, a computer system which uses both the keyboard and the mouse as input devices has been exemplified. As an input device, only the keyboard may be employed, and a pointing device other than the mouse may be used.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An apparatus for remotely controlling a remote computer system installed at a remote location using a local master apparatus, wherein:
   (a) said master apparatus comprises,
   a master input device for producing an operation signal,
   master transmission means, connected to said master input device, for encoding the operation signal from the master input device, and transmitting the encoded operation signal to said remote computer system via a first communication line, a master computer which can perform a test operation corresponding to said encoded operation signal transmitted to said remote computer, decoding means, connected to said master transmission means, for decoding an encoded operation signal from said master transmission means, means, connected to said decoding means, for supplying a decoded operation signal from said decoding means to said master computer, said master computer performing said test operation in response to said decoded operation signal and producing a data processing result, and a first display device for displaying the data processing result of said master computer; and (b) said remote computer system comprises, a remote computer for receiving the encoded operation signal transmitted from said master apparatus through said first communication line, for decoding the encoded operation signal into the operation signal, and for performing a data processing operation corresponding to the test operation performed by the master computer in response to the operation signal and outputting a video signal as a product of said processing;

wherein said apparatus for remotely controlling further comprises:

remote transmission means, connected to said remote computer, for encoding the video signal output from said remote computer, and transmitting the encoded video signal to said master apparatus through a second communication line;

master reproduction means for receiving the encoded video signal transmitted from said remote transmission means through said second communication lines, and decoding the encoded video signal to the original video signal; and a second display device, connected to said master reproduction means, for displaying an image in response to the video signal decoded by said master reproduction means so that an operator can compare the data processing result displayed by said first display device with said image displayed by said second display device to confirm a correspondence therebetween.

2. An apparatus according to claim 1, further comprising:

detection means for detecting a coincidence/non-coincidence between display contents of said first and second display devices; and means for outputting a detection result of said detection means.

3. An apparatus according to claim 1, further comprising:

means for causing display timings of said first and second display devices to coincide with each other.

4. An apparatus according to claim 1, wherein said master input device includes a keyboard, the operation signal is a key operation signal indicating an operation of a given key, and said decoder means supplies a decoded key operation signal to a keyboard connection terminal of said remote computer.

5. An apparatus according to claim 1, wherein said master input device includes a keyboard and a mouse, the operation signal includes a key operation signal indicating an operation of a given key, and a mouse operation signal indicating an operation of said mouse, said master transmission means encodes the operation signal so that the operation signal from said keyboard and the operation signal from said mouse can be discriminated from each other, and said decoder means decodes the key operation signal and the mouse operation signal, supplies the decoded key operation signal to a keyboard connection terminal of said remote computer, and supplies the decoded mouse operation signal to a mouse connection terminal thereof.

6. An apparatus according to claim 1, wherein said master input device includes:

an external storage device; and means, connected to said external storage device, for converting data stored in said external storage device into an operation signal, and supplying the converted operation signal to said master transmission means, and the data stored in said external storage device is supplied to said remote computer as if said master input device were operated.

7. An apparatus according to claim 1, wherein said remote computer system further comprises:

a respective remote input device, and switch means, connected to said decoder means, said respective remote input device, and an input terminal of said remote computer, for switching the operation signal decoded by said decoder means, and the operation signal from said respective remote input device, and supplying the selected signal to said remote computer.

8. An apparatus according to claim 1, wherein at least one of said master transmission means and said decoder means comprises:

a first-in first-out data storage device for temporarily holding a supplied signal.

9. An apparatus for remotely operating a remote computer installed at a remote location, said computer having a respective remote input device, the apparatus comprising:

an input device for producing an operation signal in response to an input operation;

transmission means, connected to said input device, for encoding the operation signal from said input device, and outputting the encoded operation signal;

network means, connected to said transmission means, for transmitting the encoded operation signal output from said transmission means;

reception means, connected to said network means, for receiving the signal transmitted from said transmission means through said network means;

supply means, connected to said reception means, for decoding the received signal to the operation signal, and supplying the decoded operation signal to said remote input device of said computer so as to operate said computer in response to the operation signal from said remote input device;

remote transmission means for encoding a video signal output from said computer, and transmitting the encoded video signal to said network means;

master reproduction means for receiving the encoded video signal transmitted from said remote transmission means through said network means, and decoding the encoded video signal to the original video signal;

a first display device, connected to said master reproduction means, for displaying an image in response to the video signal decoded by said master reproduction means;

a master computer which can perform a test operation corresponding to the encoded operation signal decoded by said supply means and supplied to said remote input device of said remote computer;

decoding means, connected to said transmission means, for decoding an encoded operation signal from said transmission means to an operation signal;

means, connected to said decoding means, for supplying a decoded operation signal from said decoding means to said master computer, said master computer performing said test operation in response to said decoded operation signal and producing a data processing result; and a second display device for displaying the data processing result of said master computer.

10. An apparatus according to claim 9, further comprising:

means for detecting whether a coincidence exists between data processing results of said remote computer and said master computer.

11. An apparatus for remotely operating a remote computer having a processor normally connected to a respective keyboard and which performs data processing in response to an operation signal from said respective keyboard, comprising:

a master operation keyboard;

master encoding and transmission means, connected to said master operation keyboard, for encoding a key operation signal from said master operation keyboard into a transmission signal, and outputting the encoded key operation signal as said transmission signal onto a first communication line;

decoder means for receiving the transmission signal transmitted through said first communication line, and decoding the transmission signal to a key operation signal;

supply means, connected to said decoder means and said remote computer, for supplying the decoded key operation signal to a keyboard connector of said remote computer, and operating said remote computer in accordance with an operation of said master operation keyboard;

remote transmission means for encoding an output signal from said remote computer, and outputting the encoded signal onto a second communication line;

master reproduction means for receiving the signal transmitted from said remote transmission means through said second communication line, and decoding the signal to an original signal;

a first monitor device arranged adjacent to said master operation keyboard, connected to said master reproduction means, and operated in response to the signal decoded by said master reproduction means and an output signal from said computer;

a master computer which can perform a test operation corresponding to said encoded key operation signal transmitted and supplied to the keyboard connector of said remote computer;

decoding means, connected to said master transmission means, for decoding a branched output signal from said master transmission means to an operation signal;

means, connected to said decoding means, for supplying the decoded operation signal from said decoding means to said master computer, said master computer performing said test operation in response to said decoded operational signal from said decoding means and producing a data processing result; and a second monitor device for displaying said data processing result of said master computer.

* * * * *